US010232787B2

(12) United States Patent
Mozurkewich et al.

(10) Patent No.: US 10,232,787 B2
(45) Date of Patent: Mar. 19, 2019

(54) SECOND ROW SEAT DUMP HANDLE BEZEL INTEGRATED LIGHT

(71) Applicant: Ford Global Technologies, LLC, Dearborn, MI (US)

(72) Inventors: Kevin Mozurkewich, Livonia, MI (US); Johnathan Andrew Line, Northville, MI (US); Marcos Silva Kondrad, Macomb, MI (US); Kevin Wayne Preuss, Berkley, MI (US); Keith Allen Godin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 15/628,192

(22) Filed: Jun. 20, 2017

(65) Prior Publication Data
US 2018/0361941 A1    Dec. 20, 2018

(51) Int. Cl.
| B60R 7/04 | (2006.01) |
|---|---|
| B60Q 3/233 | (2017.01) |
| B60N 3/02 | (2006.01) |
| B60N 2/30 | (2006.01) |
| B60N 3/10 | (2006.01) |
| B60N 2/02 | (2006.01) |

(52) U.S. Cl.
CPC .......... B60R 7/043 (2013.01); B60N 2/3045 (2013.01); B60N 3/02 (2013.01); B60N 3/103 (2013.01); B60Q 3/233 (2017.02); B60N 2002/0216 (2013.01)

(58) Field of Classification Search
CPC ........... B60R 7/043; B60Q 3/233; A47C 7/62; A47C 7/725; B60N 2002/0216; B60N 3/02; B60N 3/103; B60N 2/90; B60N 2/3045

USPC ..... 297/188.1, 183.1, 217.6, 188.13, 188.12, 297/335, 188.09
See application file for complete search history.

(56) References Cited

U.S. PATENT DOCUMENTS

| 5,297,010 A | 3/1994 | Camarota et al. | |
|---|---|---|---|
| 5,927,800 A * | 7/1999 | Stallworth | A47C 7/62 297/188.08 |
| 6,161,896 A * | 12/2000 | Johnson | B60R 7/043 297/188.08 |
| 6,203,104 B1 * | 3/2001 | Matsuo | B60N 2/3013 297/188.1 |
| 6,390,547 B1 * | 5/2002 | Spykerman | B60N 2/3047 296/37.15 |

(Continued)

FOREIGN PATENT DOCUMENTS

KR    2016004396    * 12/2016

*Primary Examiner* — Milton Nelson, Jr.
(74) *Attorney, Agent, or Firm* — Vichit Chea; Price Heneveld LLP

(57) ABSTRACT

A seating assembly includes a seatback. A seat includes a top side that defines a seating surface and a bottom side that includes an attachment interface. The seat is operably coupled with the seatback and is rotatable between a horizontal orientation and a vertical orientation. A closeable pocket is removably coupled with the attachment interface of the seat. The closeable pocket includes a zipper. A handle operably disengages a latching mechanism of the seat and is disposed above the closeable pocket. The handle includes a peripheral bezel with a light source, which is a light emitting diode, configured to illuminate the closeable pocket and a cargo space disposed below the seat.

18 Claims, 4 Drawing Sheets

(56) References Cited

U.S. PATENT DOCUMENTS

| | | |
|---|---|---|
| 7,270,452 B2 | 9/2007 | Wang |
| 7,537,364 B2 | 5/2009 | Misawa et al. |
| 8,998,313 B2 * | 4/2015 | Reh .................. B64D 11/06 297/188.1 |
| 9,090,209 B2 * | 7/2015 | Aguirre ................ B60R 7/043 |
| 9,950,674 B1 * | 4/2018 | Kalergis ............... B60N 2/3009 |
| 2002/0145313 A1 * | 10/2002 | Alejandro ................ B60N 2/04 297/183.1 |
| 2007/0086201 A1 | 4/2007 | Wang |

* cited by examiner

SECOND ROW SEAT DUMP HANDLE BEZEL INTEGRATED LIGHT

FIELD OF THE DISCLOSURE

The present disclosure generally relates to a second row seat, and more particularly to a second row seat that includes a dump handle and a bezel with an integrated light for a seating assembly.

BACKGROUND OF THE DISCLOSURE

Optimization of storage space within a vehicle is important in today's vehicles. Only limited space is available in any vehicle and carefully utilizing space within the vehicle, without crowding occupants or creating an unsafe environment, is important and can significantly increase the driving or riding experience.

SUMMARY OF THE DISCLOSURE

According to one aspect of the present disclosure, a seating assembly includes a seatback. A seat includes a top side that defines a seating surface and a bottom side that includes an attachment interface. The seat is operably coupled with the seatback and is rotatable between a horizontal orientation and a vertical orientation. A closeable pocket is removably coupled with the attachment interface of the seat. The closeable pocket includes a zipper. A handle operably disengages a latching mechanism of the seat and is disposed above the closeable pocket. The handle includes a peripheral bezel with a light source, which is a light emitting diode, configured to illuminate the closeable pocket and a cargo space disposed below the seat.

According to another aspect of the present disclosure, a vehicle seating assembly includes a seatback. A seat is operably coupled with the seatback and is rotatable between a horizontal orientation and a vertical orientation. A closeable pocket is integrally formed with a bottom side of the seat. The closeable pocket includes a zipper. A dump handle is disposed above the closeable pocket and includes a light source configured to illuminate the closeable pocket when the seat is in the vertical orientation.

According to yet another aspect of the present disclosure, a vehicle seating assembly includes a seatback. A seat includes a top side that defines a seating surface and a bottom side that includes an attachment interface. The seat is operably coupled with the seatback and is rotatable between a horizontal orientation and a vertical orientation. A closeable pocket is removably coupled with the attachment interface of the seat. The closeable pocket includes a zipper. A handle is disposed above the closeable pocket. The handle includes a peripheral bezel with a light source, which is a light emitting diode, configured to illuminate the closeable pocket when the seat is in the vertical orientation.

Embodiments of the first aspect, the second aspect, and the third aspect of the present disclosure, as set forth in the preceding paragraphs, can include any one or a combination of the following features:

A light source illuminates a cargo space disposed below a seat.
The light source is configured to direct a beam of illumination at a downward angle.
The light source is a light emitting diode.
The light source is electrically coupled through the seat to a vehicle body harness.
The light source is in electrical communication with the vehicle body harness, which activates a dome light and the light source simultaneously when the seat is in the vertical orientation.
A light source activation feature is disposed proximate a peripheral bezel and is in electrical communication with the light source.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
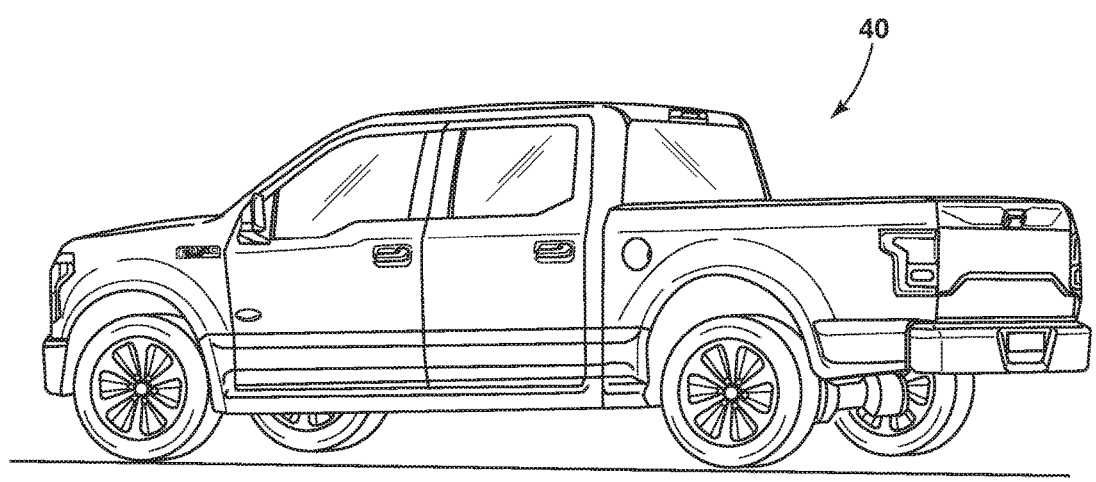
FIG. 1 is a vehicle incorporating a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-5, reference numeral 10 generally designates a seating assembly that includes a seatback 12. A seat 14 includes a top side 16 that defines a seating surface 18 and a bottom side 20 that includes an attachment interface 22.

The seat 14 is operably coupled with the seatback 12 and is rotatable between a horizontal orientation and a vertical orientation. A closeable pocket 24 is removably coupled with the attachment interface 22 of the seat 14. The closeable pocket 24 includes a zipper 26. A handle 28 operably disengages a latching mechanism 30 of the seat 14 and is disposed above the closeable pocket 24. The handle 28 includes a peripheral bezel 32 with a light source 34, which is a light emitting diode configured to illuminate the closeable pocket 24 and a cargo space or area 36 disposed below the seat 14.

Figure 2:
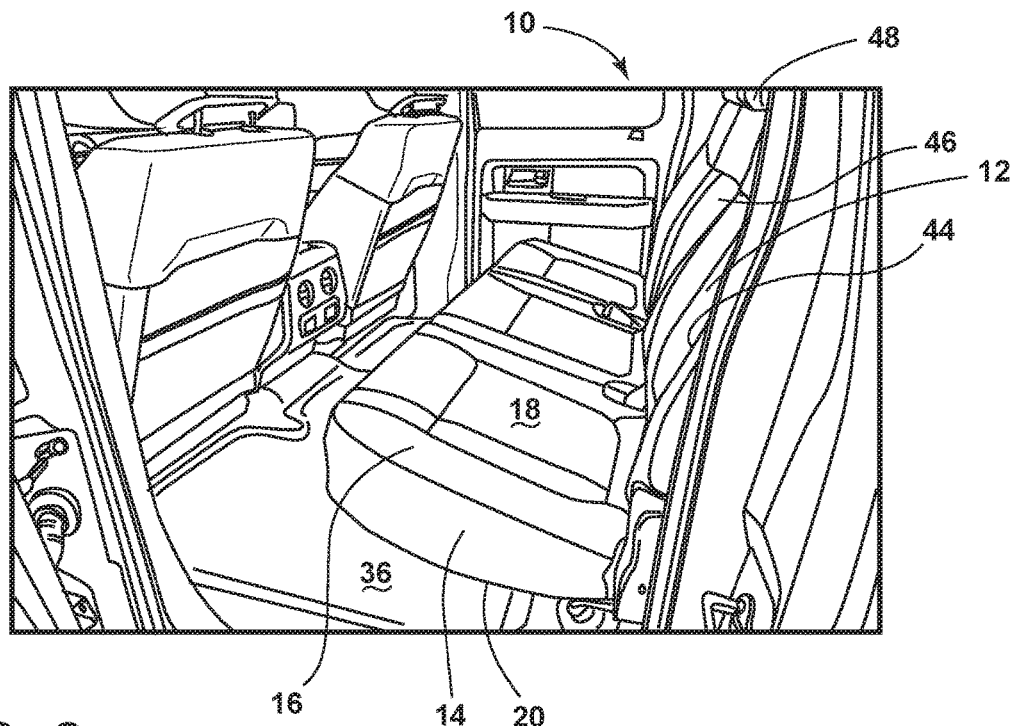
FIG. 2 is a top perspective view of a seating assembly of the present disclosure that includes an integrated lighting system.
Figure 3:
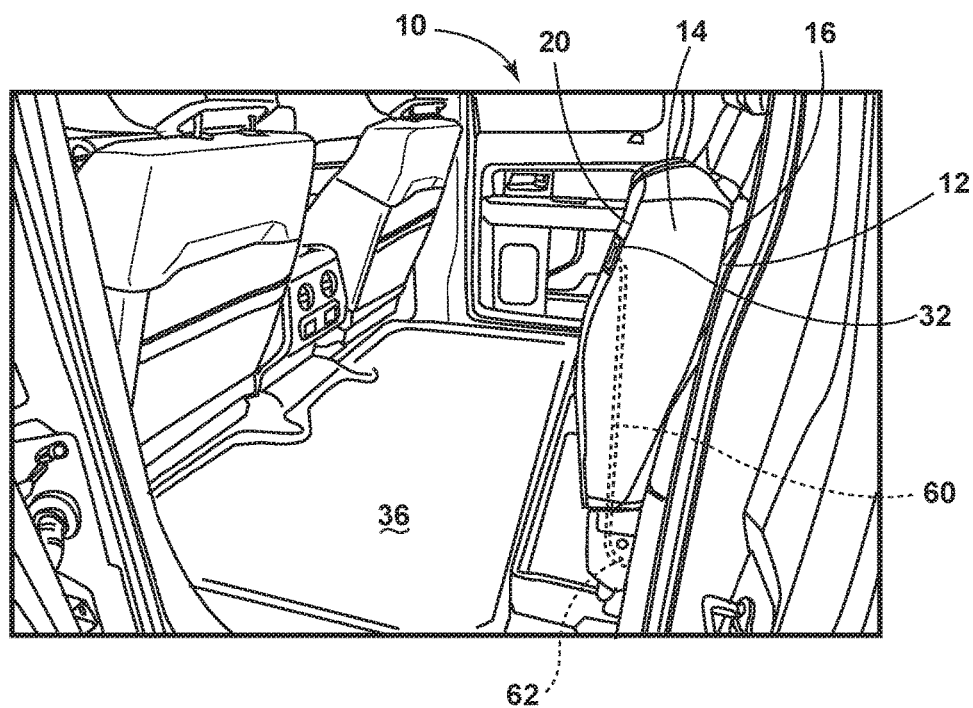
FIG. 3 is a top perspective view of a second row of a seating assembly of the present disclosure with a seat in a vertical orientation.

With reference now to FIGS. 1-3, the seating assembly 10 may be used in any vehicle 40, such as a car, a truck, a van, etc. It is also contemplated that the concept set forth in this disclosure may be utilized in a front or forward position of the vehicle 40 as well as a rear or rearward position of the vehicle 40. The seating assembly 10, as illustrated, may be positioned on rail slides to allow fore and aft movement of the seating assembly 10 relative to the vehicle 40. The seat 14 may be adjustable in firmness, relative position, etc. to accommodate passengers of various sizes. The seatback 12 of the seating assembly 10 includes a lower lumbar region 44 and an upper thoracic region 46 as well as a head restraint 48 disposed above and operably coupled with the upper thoracic region 46. Each of the components of the seatback 12 may be configured for adjustability to properly support the weight of various occupants inside the vehicle 40. One such component may be an actuatable lumbar support, which may include an inflatable bladder or mechanical assembly that can be adjusted based on user preferences.

Figure 4:
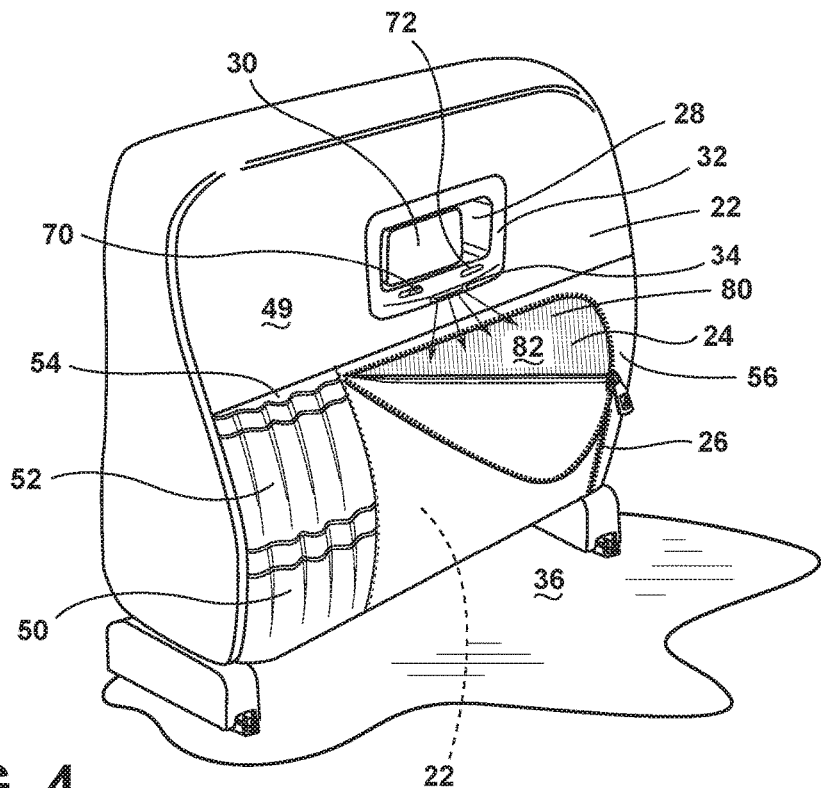
FIG. 4 is a top perspective view of a second row seating assembly with a seat disposed in a vertical orientation.

With reference now to FIGS. 3 and 4, the seat 14 includes a bottom wall 49 having a trim panel storage organizer 56 that includes a variety of storage features configured to optimize storage options for occupants of the vehicle 40. In the illustrated embodiment, the attachment interface 22 is configured to support a variety of different trim panel storage organizers 56 that include one or more storage options, such as the closeable pocket 24. Notably, the attachment interface 22 may include a variety of features that can permanently or temporarily secure the trim panel storage organizer 56 with the bottom wall 49. Additional pockets, such as a pocket 50, which includes a pleated outer wall 52 with an open top 54, can also be provided. Regardless, the light source 34 of the bezel 32 is configured to illuminate the closeable pocket 24 and the cargo space 36 below the seat 14. It is also generally contemplated that the peripheral bezel 32 may include an adjustable light source 34 that is configured to move upon manual manipulation by a user. Specifically, the light source 34 may be rotatable relative to the peripheral bezel 32, or may be linearly adjusted relative to the peripheral bezel 32. Additionally, the light source 34 may be capable of aiming. Specifically, if the user is interested in aiming the light source at a specific area within the vehicle 40, the light source 34 can be adjusted. For example, if the user simply wishes to illuminate the cargo space 36, the user can aim a light beam of the light source 34 at the cargo space 36 and adjust a lens of the light source 34 to provide a wide casting of the light beam. Alternatively, if a specific item within the cargo space 36 or the closeable pocket 24 is difficult to see, the user can adjust the light source 34 at the item and adjust the intensity of the light beam, as desired.

The bezel 32 may be injection molded or formed and is secured to the underside of the seat 14 via fasteners, adhesive, etc. In addition, wiring 60 may be routed through the seat 14 to power the light source 34. The wiring 60 may be in electrical communication with a vehicle body harness that activates the light source 34 and a dome light of the vehicle 40 simultaneously when the seat 14 is in the vertical orientation. The light source 34 may be constructed from a variety of components, including fluorescent lights, incandescent bulbs, light-emitting diodes (LEDs), etc. As LEDs traditionally have a minimal power requirement, a battery could also be utilized to power the light source 34. In still another configuration, the wiring 60 that is in electrical communication with the light source 34 may extend to a portion of the seat 14 that is in electrical communication with a vehicle wiring harness 62 only when the seat 14 is in the vertical orientation. When the seat 14 is moved to the horizontal orientation, the wiring 60 may lose electrical contact with the vehicle wiring harness 62. When electrical communication with the vehicle wiring harness 62 is lost, power would not be supplied to the light source 34. Accordingly, in this instance, it would not be possible for a user to accidentally leave the light source 34 activated or to accidentally activate the light source 34 when the seat 14 is in the horizontal orientation.

It is conceived that the light source 34 may include any of a variety of light source activation features that are disposed proximate the peripheral bezel 32 and which are in electrical communication with the light source 34. For example, the light source 34 may be activated upon actuation of a switch 70 controlled by the user. Alternatively, an electric eye 72 may be positioned on the peripheral bezel 32, and upon detection of movement, the light source 34 can be configured to activate. Still another alternative includes activation of a switch in the seat 14 that is activated when the seat 14 is moved from the horizontal orientation to the vertical orientation. In this instance, when the seat 14 is moved to the vertical orientation, the light source 34 is activated, which directs light toward the cargo space 36, the closeable pocket 24, or both. When the seat 14 is lowered to the horizontal orientation, the light source 34 is deactivated. Yet another alternative includes manual actuation of the latching mechanism 30, at least slightly, which results in activation of an internal switch in electrical communication with the light source 34, resulting in the light source 34 being activated for a predetermined time period. If additional time is desired, then the latching mechanism 30 can again be actuated when the seat 14 is in the vertical orientation to again activate the internal switch.

As previously noted, the light source 34 may be activatable automatically when the dome light activates (based on user activation, a door opening, etc.), or may be manually adjusted based on the preferences of a user. In addition, the light source 34 may be configured to dim out over an extended period of time, or shut off after an extended period of time. Moreover, although some configurations disclosed herein do not contemplate activation of the light source 34 when the seat 14 is in the horizontal orientation, in some instances, it may be possible to activate light sources 34 when the seat 14 is in the horizontal orientation. This may be convenient when a user is looking for a specific item beneath the seat 14, but cannot raise the seat 14 as other items may be stored on top of the seat 14 when in the horizontal orientation.

The light source 34 may direct light outward or primarily at a downward angle. However, it is also contemplated that light that is cast by the light source 34 may be manually adjusted. In this instance, the light beam of the light source 34 can be directed upward, downward, to one side, etc.

Figure 4A:
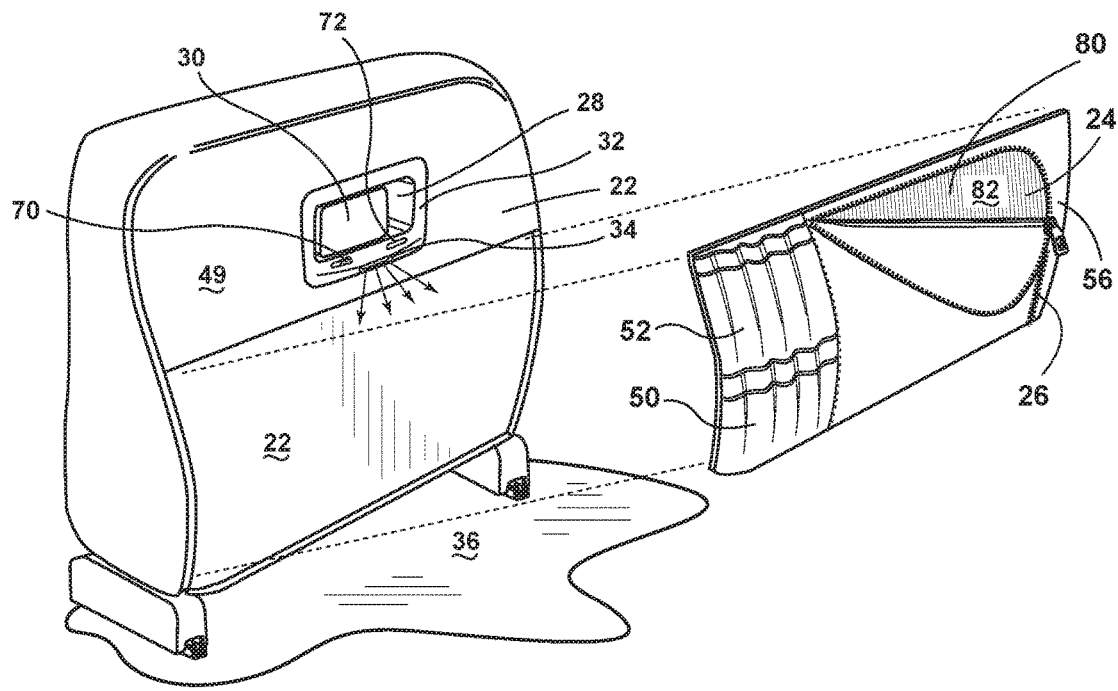
FIG. 4A is a top perspective view of a second row seating assembly with a trim panel storage organizer removed.
Figure 5:
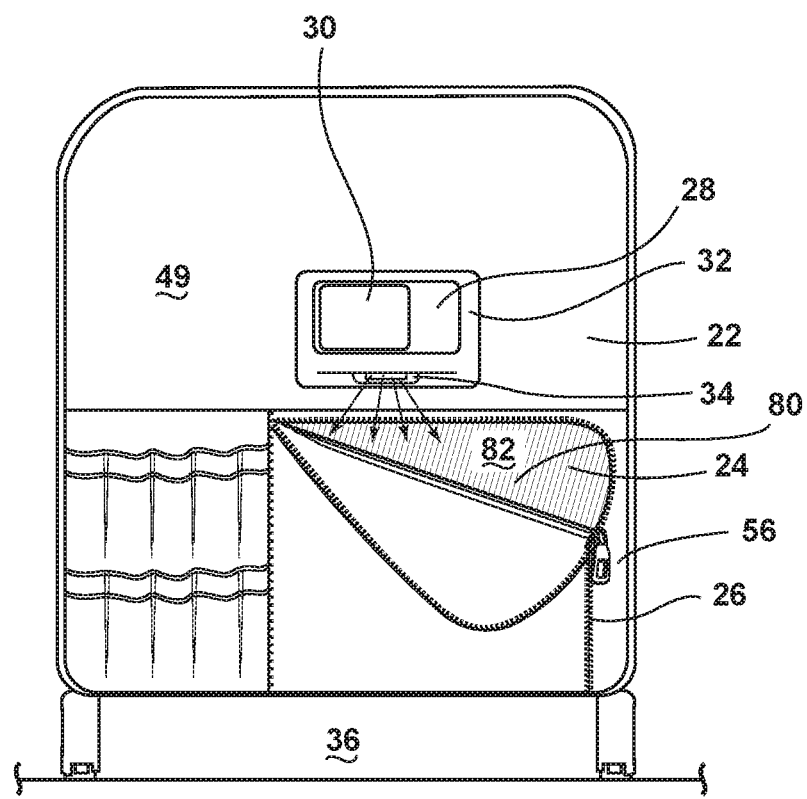
FIG. 5 is a front elevational view of an underseat of a seating assembly of the present disclosure.

With reference to FIGS. 4 and 4A, it is also generally contemplated that the trim panel storage organizer 56 disposed below the peripheral bezel 32 may be connectable with the bottom wall 49 of the seat 14. It is generally contemplated that the trim panel storage organizer 56 may be connected via the attachment interface 22 using adhesive, fasteners, etc. However, it is generally contemplated that the trim panel storage organizer 56 may also be removably connected with the bottom wall 49 of the seat 14 via the attachment interface 22. Moreover, it is contemplated that connection of the trim panel storage organizer 56 with the bottom wall 49 of the seat 14 may result in subsequent availability of the functionality of the light source 34 on the peripheral bezel 32. In this instance, connection of the trim panel storage organizer 56 with the bottom wall 49 completes an electrical communication or closes a switch, making the light source 34 available to a user. Accordingly, in one embodiment, the use and activation of the light source 34 is prohibited absent connection of the trim panel storage organizer 56 with the bottom wall 49 of the seat 14. It is also contemplated that operable connection of the trim panel storage organizer 56 with the bottom wall 49 the seat 14 may also result in activation of secondary light sources, such as an ambient light source 80, that shines through an inside wall 82 of the closeable pocket 24. In this instance, non-direct ambient light may shine through the inside wall 82 of the closeable pocket 24 to provide visibility to items stored therein. The secondary light source 80 may be used in conjunction with the primary light source 34.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
   a seatback;
   a seat including a top side defining a seating surface and a bottom side including an attachment interface, the seat operably coupled with the seatback and rotatable between a horizontal orientation and a vertical orientation;
   a closeable pocket removably coupled with the attachment interface of the seat, the closeable pocket including a zipper; and
   a handle that operably disengages a latching mechanism of the seat and which is disposed above the closeable pocket, the handle including a peripheral bezel with a light source, which is a light emitting diode, configured to illuminate the closeable pocket and a cargo space disposed below the seat.

2. The seating assembly of claim 1, further comprising:
   a light source activation feature disposed proximate the peripheral bezel and in electrical communication with the light source.

3. The seating assembly of claim 1, wherein the light source is configured to direct a beam of illumination at a downward angle.

4. The seating assembly of claim 1, wherein the light source is electrically coupled through the seat to a vehicle body harness.

5. The seating assembly of claim 4, wherein the light source is in electrical communication with the vehicle body harness that activates a dome light and the light source simultaneously when the seat is in the vertical orientation.

6. A vehicle seating assembly comprising:
   a seatback;
   a seat operably coupled with the seatback and rotatable between a horizontal orientation and a vertical orientation;
   a closeable pocket integrally formed with a bottom side of the seat, the closeable pocket including a zipper; and
   a dump handle disposed above the closeable pocket and having a light source configured to illuminate the closeable pocket when the seat is in the vertical orientation.

7. The seating assembly of claim 6, wherein the light source is electrically coupled through the seat to a vehicle body harness.

8. The seating assembly of claim 7, wherein the light source is in electrical communication with the vehicle body harness that activates a dome light and the light source simultaneously when the seat is in the vertical orientation.

9. The seating assembly of claim 6, wherein the light source also illuminates a cargo space disposed below the seat.

10. The seating assembly of claim 6, wherein the light source is configured to direct a beam of illumination at a downward angle.

11. The seating assembly of claim 6, wherein the light source is a light emitting diode.

12. The seating assembly of claim 6, further comprising:
a light source activation feature disposed proximate a bezel and that supports the light source and is in electrical communication with the light source.

13. A vehicle seating assembly comprising:
a seatback;
a seat including a top side defining a seating surface and a bottom side including an attachment interface, the seat operably coupled with the seatback and rotatable between a horizontal orientation and a vertical orientation;
a closeable pocket removably coupled with the attachment interface of the seat, the closeable pocket including a zipper; and
a handle disposed above the closeable pocket, the handle including a peripheral bezel with a light source, which is a light emitting diode, configured to illuminate the closeable pocket when the seat is in the vertical orientation.

14. The seating assembly of claim 13, wherein the light source is electrically coupled through the seat to a vehicle body harness.

15. The seating assembly of claim 14, wherein the light source is in electrical communication with the vehicle body harness that activates a dome light and the light source simultaneously when the seat is in the vertical orientation.

16. The seating assembly of claim 13, wherein the light source also illuminates a cargo space disposed below the seat.

17. The seating assembly of claim 13, wherein the light source is configured to direct a beam of illumination at a downward angle.

18. The seating assembly of claim 13, further comprising:
a light source activation feature disposed proximate the bezel and in electrical communication with the light source.

* * * * *